United States Patent
Malinovskiy et al.

(10) Patent No.: US 7,589,672 B2
(45) Date of Patent: Sep. 15, 2009

(54) METHOD FOR DETERMINING POSITIONAL DATA

(75) Inventors: Alexey Malinovskiy, Lörrach (DE); Rudolf Sollacher, Eching (DE)

(73) Assignee: Siemens Aktiengesellschaft, Munich (DE)

( * ) Notice: Subject to any disclaimer, the term of this patent is extended or adjusted under 35 U.S.C. 154(b) by 184 days.

(21) Appl. No.: 11/628,230

(22) PCT Filed: Apr. 11, 2005

(86) PCT No.: PCT/EP2005/051586

§ 371 (c)(1), (2), (4) Date: Sep. 12, 2007

(87) PCT Pub. No.: WO2005/119293

PCT Pub. Date: Dec. 15, 2005

(65) Prior Publication Data

US 2008/0100505 A1 May 1, 2008

(30) Foreign Application Priority Data

Jun. 4, 2004 (DE) .................. 10 2004 027 292

(51) Int. Cl.
G01S 3/02 (2006.01)
G01S 5/14 (2006.01)
(52) U.S. Cl. .............. 342/463; 342/357.08; 342/357.17
(58) Field of Classification Search .................. 342/463, 342/357.08, 357.17
See application file for complete search history.

(56) References Cited

U.S. PATENT DOCUMENTS

| 4,583,177 | A | 4/1986 | Meyer |
| 5,661,492 | A | 8/1997 | Shoap et al. |
| 5,691,922 | A | 11/1997 | McEwan et al. |
| 7,231,216 | B2* | 6/2007 | Tafazolli et al. .......... 455/456.1 |
| 2002/0072370 | A1* | 6/2002 | Johansson et al. ........... 455/436 |
| 2003/0074471 | A1 | 4/2003 | Anderson et al. |
| 2005/0075111 | A1* | 4/2005 | Tafazolli et al. .......... 455/456.1 |
| 2008/0218411 | A1* | 9/2008 | Wigren et al. .......... 342/357.15 |

FOREIGN PATENT DOCUMENTS

| EP | 0 247 949 A1 | 12/1987 |
| WO | WO 02/03091 A2 | 1/2002 |
| WO | WO 03/107595 A1 | 12/2003 |

* cited by examiner

Primary Examiner—Thomas H Tarcza
Assistant Examiner—Harry Liu

(57) ABSTRACT

An aspect of the invention relates to a method for determining positional data of at least one node of a network, said network comprising a number of nodes, whereby the positional data refers to an internal coordinate system. The method comprises the following steps: a) preparation of positional data for a sub-set of nodes, b) determination of separation data for the least one node, c) determination or, on repetition of step c), correction of the positional data for the at least one node, depending on the positional data from step a), the separation data determined in step b) and positional data of the at least one node and d) repetition of steps a) to c), until an interruption condition is fulfilled.

20 Claims, 8 Drawing Sheets

METHOD FOR DETERMINING POSITIONAL DATA

CROSS REFERENCE TO RELATED APPLICATIONS

This application is the US National Stage of International Application No. PCT/EP2005/051586, filed Apr. 11, 2005 and claims the benefit thereof. The International Application claims the benefits of German application No. 10 2004 027 292.1 DE filed Jun. 4, 2004, both of the applications are incorporated by reference herein in their entirety.

FIELD OF INVENTION

The invention relates to a method for determining positional data of at least one node of a network in an internal coordinate system and a method for determining global positional data for at least one node of a network in a global coordinate system.

BACKGROUND OF INVENTION

In many technical systems, it is advantageous to know and track the position of individual devices, referred to in the following as nodes. Whereas in the open, GPS can be used for this purpose, for example for vehicle navigation, other methods are required in buildings or inner cities. Examples of suitable applications or systems are fire alarm sensors in buildings, sensors or actuators in a production system, sensor nodes in a wireless sensor network or mobile terminals in an ad hoc radio network. Furthermore, it is advantageous if the components or nodes form a communication network and are able to independently determine their position without a central entity, for example a localization server. Finally, it is also advantageous if the least possible infrastructure has to be assumed for position determination, i.e. if for example only a few anchor nodes with a known position have to be provided.

Known decentralized methods for position determination presume anchor nodes, i.e. nodes whose position is always known. This requires an installation cost and presumes that the positions of the individual anchor nodes are compatible, i.e. that their positions in the same coordinate system are known.

The only known method that functions without anchor nodes is the "GPS Free Positioning System" from Capkun et al., Swiss Federal Institute of Technology, Lausanne. The disadvantage with this method is, however, that it is described in only two dimensions, and because it is based on a local triangulation cannot therefore completely take account of redundant information.

SUMMARY OF INVENTION

An object of the invention is to provide a method for determining positional data, whereby the disadvantages of known methods do not occur.

An object of determining positional data is achieved by the features of the independent claims. Preferred embodiments are defined in, among other places, the dependent claims and/or are explained in the further description.

A method for determining positional data of at least one node of a network that includes a number of nodes includes the following steps:

Step a): Provision of positional data, with the positional data referring to an internal or relative coordinate system for a subset of nodes of the number of nodes, with at the least one node not being contained in the subset and with the positional data describing at least the respective, especially estimated, position of the nodes of the subset in the internal coordinate system.

Step b): Determination of separation data for the at least one node, with the separation data in each case being a measure of the distance between the at least one node and the respective nodes of the subset.

Step c): Determination or, on repetition of step c) correction, of the positional data of the at least one node relative to the positional data of the nodes of the subset provided in step a), the separation data determined in step b) and positional data of the at least one node, with the positional data of the at least one node corresponding to the initial positional data during the first performance of step c) and otherwise to the positional data of the previous performance of step c).

Step d): Repetition of steps a) to c) until the interruption criterion is fulfilled.

An aspect of the invention is thus the determination of positional data of the at least one node by means of an iterative method. The positional data in particular gives the positional data of the at least one node in internal or relative coordinates. In the first iteration step, the positional data of the at least one node is determined relative to the positional data of the nodes of the subset provided in step a), the separation data determined in step b) and initial positional data. The initial positional data can, for example, be set as zero but of course any other choice can be made. With regard to the implementation of the method it is of course important that there are no numerical problems. For this reason, the initial positional data values chosen should not be too large. During repetitions of steps a) to c) the positional data of the at least one node is then corrected relative to the positional data of the nodes of the subset provided in step a), the separation data determined in step b) and the positional data of the at least one node determined in the previous performance of step c).

In a preferred embodiment, the network has exclusively mobile nodes whose position is not known priori. This means that the method can especially also be used for networks with exclusively mobile nodes. The determined positional data in this case can, for example, be used for navigation in a relative or internal coordinate systems.

Advantageously, the subset of nodes has a relatively large number of nodes, especially more than three nodes. With at least four neighboring nodes, i.e. the subset of nodes contains at least four nodes, a position can in principle be unambiguously determined. The number of neighboring nodes or the number of nodes in the subset of nodes for which distances can be measured depends on the method of measurement and on the environment.

Furthermore, it is advantageous if the positional data of each node of the subset contains the following information:

The position or estimated position of the particular node, with the estimated position being determined in accordance with one of the claims herein;

A measure of the uncertainty of the position, or of the estimated position, of the particular node, especially a corresponding covariance matrix and/or a measure of the mobility of the particular node.

Furthermore, it is advantageous if the measure for the mobility of the particular node is a diffusion constant or mobility constant, an estimate of the actual speed vector and/or an estimated trajectory.

The speed vector is, for example, determined with the aid of a Kalman filter from the corrections of the static position estimation by means of the distance measurements. The actual position estimation is then a result of the static position estimation plus the correction by the speed vector.

A trajectory is determined from a series of successive static position estimations and, where necessary, their time intervals. Suitable representations are density estimators of these sequences of measured values, with the estimated position resulting from the estimated last position and speed as well as and the expected value of the sequences of measurements, or recurrent neural networks that estimate future positions from the previous positions.

The measure for the mobility of the node from previous observations is preferred, especially of the movements that determine the particular node. To determine a measure for the mobility it is also possible to measure the speed of the node directly, e.g. by means of an odometer.

Furthermore, the distance of the at least one node from nodes of the subset in step b) is advantageously determined by means of radar or by using the attenuation of a radio signal. It is also possible to determine the distance of the at least one node from nodes of the subset in step b) by using times of arrival. In this case, the distance is measured, for example, by ultrasound It should be mentioned in this context that the nodes of the subset can be formed from the nodes which can be reached by the at least one node by means of radar or a radio signal. This means that a check is made to determine which nodes of the network can be reached from at least one node by means of radar or radio and these nodes are included in the subset. The distance of the at least one node from these nodes can be determined at the same time.

The network can especially be an ad-hoc radio network. The nodes are then mobile terminals and/or radio masts. In the case of location based services, the static access nodes can, for example, be used as reference points, beacons or anchor nodes. This is particularly significant for determining global positional data (see below).

The distance of the at least one node from nodes of the subset in a case where the network is an ad-hoc radio network can be determined by means of a hop distance. This hop distance is the smallest number of transmissions required to send a data packet from a node A via intermediate nodes to a node B. In this case a typical transmission path is assumed for each transmission. The distance between node A and node B can be estimated from this.

The nodes of the network can also be fire alarm sensors, sensors or actuators of a production system, of an air conditioning system, or of a building monitoring system or sensor nodes of a wireless sensor network.

It is furthermore advantageous if the method is performed essentially for all nodes of the network and positional data thus determined essentially for all nodes, with the positional data of a specific node being determined in each case by determining an own subset of nodes for the specific node, with the nodes of the own subset in each case transmitting their positional data to the specific node, with the specific node determining the separation data that in each case describes the distance of the specific node from a node of its own subset.

Furthermore, it is advantageous if the positional data or the position of the at least one node is modeled as a random variable $\vec{\xi}_{i,t}$ and determined by means of the expected value $\vec{\mu}_{i,t}$ of this random variable $\vec{\xi}_{i,t}$.

Preferably, the position of the at least one node is determined by means of an iterative calculation in accordance with the following iterative calculation rule:

$$\vec{\mu}_{i,t}(k+1) = \left[ (A_{i,t-1} + D_{i,t-1})^{-1} + \sum_j \left( \vec{e}_{i,j,t}^T(k)(A_{j,t-1} + D_{j,t-1} + \sigma_j^2 I)\vec{e}_{i,j,t}(k) \right)^{-1} \right]^{-1} \times$$

$$\left[ (A_{i,t-1} + D_{i,t-1})^{-1} \vec{\mu}_{i,t-1} + \sum_j \left( \vec{e}_{i,j,t}^T(k)(A_{j,t-1} + D_{j,t-1} + \sigma_j^2 I)\vec{e}_{i,j,t}(k) \right)^{-1} \times \right.$$

$$\left. (\vec{\mu}_{j,t-1} + \hat{d}_{i,j,t}\vec{e}_{i,j,t}(k)) \right],$$

where $$\vec{e}_{i,j,t}(k) = (\vec{\mu}_{i,t}(k) - \vec{\mu}_{j,t-1})/|\vec{\mu}_{i,t}(k) - \vec{\mu}_{j,t-1}|,$$

$A_{x,\tau}$: Covariance matrix of the node x at timepoint τ,
$D_{x,\tau}$: Diffusion constant of the node x at timepoint τ,
$\mu_{x,\tau}$: Position of the node x at timepoint τ,
$d_{x,y,\tau}$: Measured distance between node x and node y at timepoint τ.

The following is the preferred initial value for the iterative calculation rule:

$$\vec{\mu}_{i,t}(0) = \vec{\mu}_{i,t-1}.$$

The interruption criterion is advantageously fulfilled if the extent of the changes of the positional data of the at least one node since the last performance of steps a) to c) is less than a predetermined threshold value. The threshold value in this case should be distinctly less than the typical measuring inaccuracy of the distance measurements performed to determine the separation data (see above).

The iterative calculation is preferably interrupted if the absolute position change between two successive iteration steps is less than a predetermined value ε, so that the following applies:

$$|\vec{\mu}_{i,t}(k+1) - \vec{\mu}_{i,t}(k)| < \epsilon.$$

The covariance matrix $A_{i,t}$ is preferably calculated using the following calculation rule:

$$A_{i,t}^{-1} \approx (A_{i,t-1} + D_i)^{-1} + \sum_j \vec{e}_{i,j,t} \vec{e}_{i,j,t}^T \left( \vec{e}_{i,j,t}^T (A_{j,t-1} + D_j + \sigma_j^2 I) \vec{e}_{i,j,t} \right)^{-1},$$

where $\vec{e}_{i,j,t}$: Unit vector in the direction of the line connecting node j to node i,
$\sigma_j$: Standard deviation of the measurement of the distance to node j,
I: Identity matrix The diffusion constant $D_{x,\tau}$ chosen should preferably be proportional to the speed, with the node x moving at this speed. The greater the diffusion constant the more the estimation of the position is influenced by the distance measurements. This, for example, reduces the influence of incorrect position estimations for mobile nodes because it is assumed in the original version that the nodes are static. The same applies when the speed vector is estimated.

It is furthermore advantageous if the diffusion constant $D_{x,\tau}$ is determined using the following calculation rule:

$$D_{i,t} = |\vec{v}_{i,t}\Delta t|^2 I,$$

where $$\vec{v}_{i,t} = \vec{v}_{i,t-1} + \kappa\left(\frac{\vec{\xi}_{i,t} - \vec{\xi}_{i,t-1}}{\Delta t} - \vec{v}_{i,t-1}\right),$$

κ: Smoothness factor,
Δt: Time interval between timepoints t−1 and t,
$\vec{v}_{x,\tau}$: Intrinsic speed of node x at timepoint τ,
I: Identity matrix.

With regard to the smoothness factor κ, the influence of measuring noise is less the smaller the smoothness factor κ. However, the estimation reacts that much more sluggishly or slowly the smaller the value of κ. Sensible values for the smoothness factor κ should not be substantially greater than 0.1.

The method for determining global or external, or absolute positional data for at least one node or for all nodes of a network that include a number of nodes, with the global positional data referring to a global or external coordinate system, includes the following steps: determining relative positional data in accordance with the method defined above for at least one node and/or for essentially all nodes of the network and determining. by means of a transformation, the global positional data as a function of the relative positional data.

One aspect of the method for deterring global positional data is thus to initially perform the method defined above for determining positional data of the at least one node and/or for essentially all nodes of the network, in order to thus determine the positional data of the at least one node or essentially all nodes of the network in the internal or relative coordinate system, and then to apply a transformation that determines global positional data from the positional data of the nodes in the relative coordinate system.

It is advantageous if the transformation is determined by means of a linear regression approach depending on a number of position pairs, with a position pair in each case including positional data of a node according to the internal coordinate system and global positional data of the same node according to the global coordinate system at the same time. A time-dependant transformation can also be used as a transformation.

It is advantageous if the position pairs are permanently available as anchor nodes. As above, the network can, for example, be an ad-hoc radio network and the nodes can be mobile terminals. In this case, the anchor nodes can, for example, be access nodes. Access nodes enable access to a different network such as the Internet. All permanently installed nodes such as routers in mesh networks, actuators, for example heating controllers, in buildings and systems are suitable as anchor nodes.

As already mentioned above, the nodes can, for example, also be fire alarm sensors, sensors or actuators of a production system, or sensor nodes of a wireless sensor network.

It is advantageous if the position pairs are determined by position measurements for the respective nodes, with the respective global positional data of the respective nodes being determined by means of a position determination device, especially a GPS position determination device.

It is also advantageous if the position pairs are determined by position measurements, with a mobile node determining its global positional data at different timepoints using a map, especially a digital one, and with various position pairs being thus provided. For example, a robot can be a mobile node that determines its global position using a digital map. The global positional data provided by the robot can be used to form the position pairs. It is also possible for a person to determine their global positional data using an external map. The global positional data of the person can then be used to determine the position pairs. It is important for the robot or the person to provide the particular global positional data at different timepoints and/or at different locations.

The global positional data $\vec{x}_{i,t}$ of one or more nodes of the network is preferably determined using the following calculation rule:

$$\vec{x}_{i,t} = M_t \vec{\mu}_{i,t} + \vec{b}_t$$

where
$M_t$: Transformation matrix at timepoint t,
$\vec{b}_t$: Displacement vector at timepoint t.

The transformation matrix $M_t$ is advantageously determined using the following calculation rule:

$$M_t = \sum_m \left(\vec{\hat{x}}_m - <\vec{\hat{x}}_m>\right)\vec{\mu}_m^T \left(\sum_m \left(\vec{\mu}_m - <\vec{\mu}_m>\right)\vec{\mu}_m^T\right)^{-1},$$

where
$\vec{x}_m$: Global position vector
$<\vec{x}_m>$: Average value over all the global position vectors of the position pairs,
$<\vec{\mu}_m>$: Average value over all the relative position vectors of the position pairs.

It is furthermore advantageous if the displacement vector $\vec{b}_t$ is determined using the following calculation rule:

$$\vec{b}_t = <\vec{x}_m> - M_t <\vec{\mu}_m>.$$

It is also advantageous if at least four position pairs are determined. In principle, any number of position pairs can be determined. It is, however, advantageous if the number of position pairs is as small as possible, because the configuration expense or the expense for providing the infrastructure is much greater the more position pairs are being determined.

The following information can also sometimes be helpful in understanding the invention:

The described method solves the positioning problem in a two-stage process. The individual nodes (devices) can measure the distance to neighboring nodes up to a certain maximum distance e.g. by means of radar, the attenuation of a radio signal or in multi-hop radio networks simply by means of the hop distance. Furthermore, the nodes exchange their actual estimated position with their neighboring nodes. In addition, a measure for the uncertainty of the position estimation (covariance matrix) and for the mobility of the node can be exchanged. The latter can be a type of mobility constant (diffusion constant) or an estimation of the actual speed vector or an estimated trajectory that was learned from previous observations (e.g. as a result of pairs {position, time difference}). Each node determines a correction for its own position, the relevant uncertainty and, if necessary, its mobility constant or its speed vector or estimated trajectories from the measurements of the actual distance to the neighboring nodes and the estimated positions of the neighbors at the timepoint of the actual distance measurement. It shares the changed values with its neighboring nodes. A coordinate system compatible with the distance measurements is formed in the network in this way. To synchronize this internal or relative coordinate system with the one external map, a transformation between these coordinate systems is learned. This transformation can generally contain a translation, a rotation, a reflection or a scaling. The parameters of the transformation are determined from a series of position details in internal (relative) and external (global/absolute) coordinates in each case, by means of a linear regression approach. These position details can, as also with other methods, be made permanently available by anchor points. Alternatively, a number of independent position measurements of a single mobile node can be sufficient if not too many nodes are mobile, or rather if the nodes can predict their trajectories sufficiently well. In these cases, the positioning also remains accurate over a longer period without renewed retraining of the transformation. The transformation can be distributed in a network and thus made available to other users.

In addition to measured values of the distances to neighboring nodes, the method in the simplest case requires only the estimated positions of the neighboring nodes that are provided by these. The method converges very quickly on an internal coordinate system in the network that is compatible with the distance measurements. The method is robust with respect to failure of individual nodes provided this does not cause the number of neighbors of a node to become too small or the network is not partitioned. The frequency of the distance measurements can be substantially reduced by an estimation of speed vectors and particularly by a prediction of trajectories; in an autonomous sensor network without external power supply the data traffic and the energy consumption can thus be substantially reduced and the service life of the sensor network therefore significantly increased. Synchronization with an external map can be achieved by means of just one mobile node; this can be either a person or a robot with a suitable device that can also determine the position of the person or robot on an external map (e.g. by clicking on a point on a digital map or by means of a navigation system)

Further features and embodiments of this invention are given in the following description of a preferred embodiment, with reference to the drawings. The drawings are as follows:

DETAILED DESCRIPTION OF INVENTION

Figure 8:
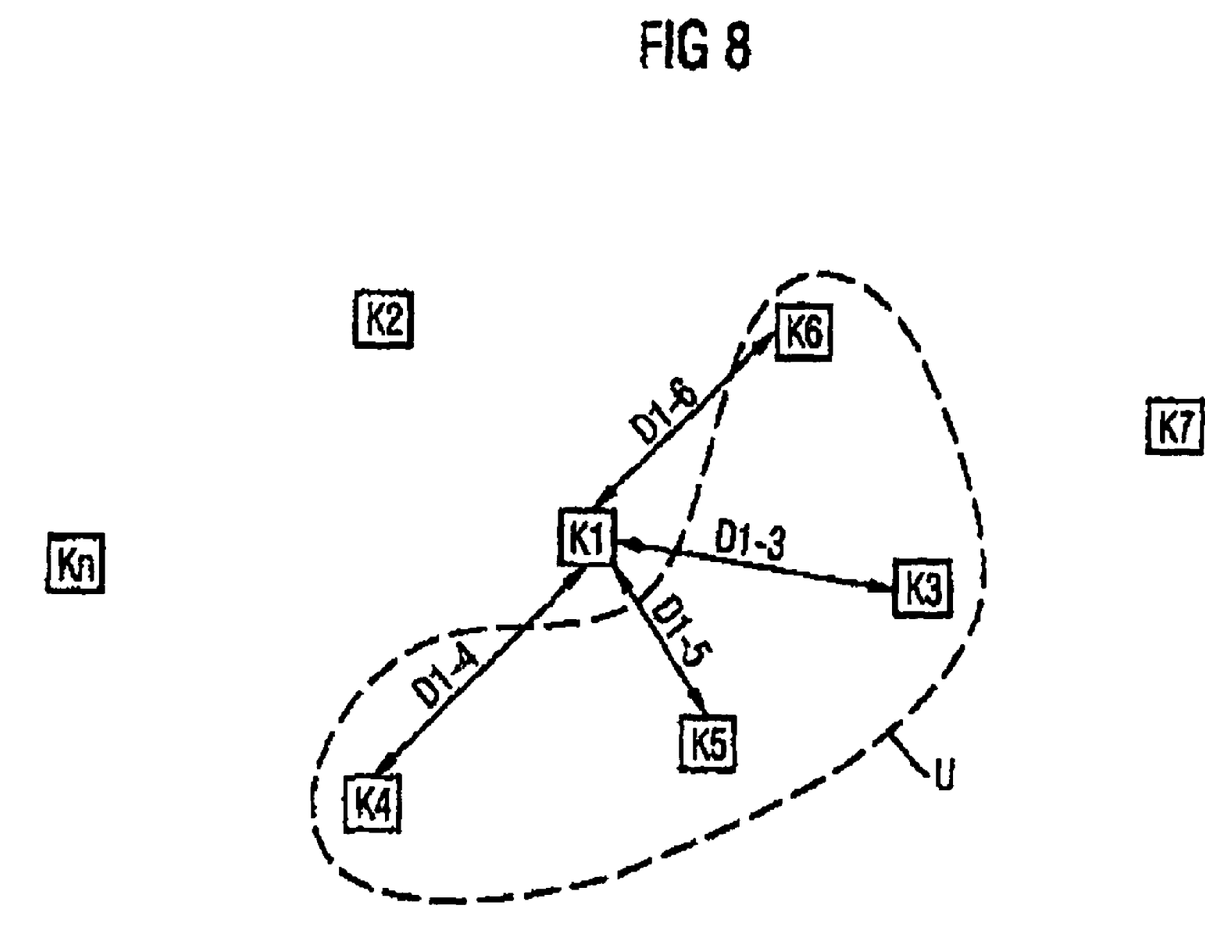

FIG. 8 shows a network N with nodes K1, ... Kn. To determine positional data of at least one node, in this case of node K1, of the network N, the positional data of a subset U of nodes K3, ..., K6 of nodes K1, ... Kn are first provided in a step a). This means that nodes K3, K4, K5 and K6 transmit their positional data to node K1. Unless otherwise stated, positional data always means positional data of an internal or relative coordinate system.

The network can, for example, be an ad-hoc radio network. In this case the nodes are mobile terminals. However, the nodes can also be fire alarm sensors, sensors or actuators of a production system or sensor nodes of a wireless sensor network.

In the following step b), node K1 determines separation data D1-3, D1-4, D1-5 and D1-6, abbreviated in the following to D1-3, ..., D1-6 by means of radar. The separation data D1-3, ..., D1-6 is in each case a measure of the distance between node K1 and the nodes of the subset U, i.e. nodes K3, K4, K5 and K6.

In the following step c), node K1 determines, or corrects, its positional data. In doing so, the positional data of nodes K3, ..., K6 of subset U, provided in step a), the separation data D1-3, ..., D1-6 determined in step b) and the positional data of node K1 from the previous performance of step c) are used.

Steps a) to c) are then repeated until an interruption criterion has been fulfilled.

The method can be performed either in succession or alternately for each node K1, ..., Kn of the network N. Positional data in the internal or relative coordinate system is thus determined for each node K1, ..., Kn of the network N.

The positional data is then converted to global positional data by means of a transformation. This enables the internal coordinate system to be depicted on a global coordinate system, for example nodes K1, ... Kn to be depicted on a map.

Permanently available anchor nodes are not required for the method of determining positional data in the relative coordinate system or in the global coordinate system. Only local internode distance measurements need to be performed and the measured distances exchanged. The positional data in the relative coordinate system can thus be determined. It then requires only a few inputs of absolute positions to enable the transformation to an absolute coordinate system. To further increase the performance of the method, the mobility of the nodes is included in the calculation.

The following first describes the method for determining the positional data according to the relative coordinate system that is particularly based on local internode distance measurements, i.e. on local measurements for determining the distance between two nodes in each case. The distance between two nodes is also referred to in the following as the internode spacing.

In the following $\hat{d}_{i,j,t}$ represents the distance between the nodes i and j at timepoint t, that, for example, is determined by radar, by the receiving power of a radio signal or, in the case of an ad-hoc radio network, by means of the hop distance. In this case, t is a discrete time index. $\vec{\xi}_{i,t}$ denotes the coordinates vector of node i at timepoint t in the relative coordinate system, i.e. in a network intrinsic coordinate system. $\vec{\xi}_{i,t}$ is a random variable. The statistical expected value of $\vec{\xi}_{i,t}$ is denoted by $\vec{\mu}_{i,t}$. The object of the method is to determine, $\vec{\mu}_{i,t}$ in relative coordinates, i.e. $\vec{\mu}_{i,t}$ is in one form of embodiment the positional data to be determined in the relative coordinates system.

$\vec{\mu}_{i,t}$ can be determined in that the maximum likelihood criterion is applied to the conditional probability $P(\vec{\xi}_{i,t} | \{\hat{d}_{i,j,t}\}, \hat{d}^{(t-1)})$ in this case, $\hat{d}^{(t-1)} = \{\{\hat{d}_{i,j,t-1}\}, \ldots, \{\hat{d}_{i,j,1}\}\}$ denotes the history or past of all distance measurements for determining internode spacing between all possible node pairs. The above conditional probability can be described as follows by using the Bayes formula for conditional probability:

$$P(\vec{\xi}_{i,t}|\{\hat{d}_{i,j,t}\},\hat{d}^{(t-1)}) = cP(\{\hat{d}_{i,j,t}\}|\vec{\xi}_{i,t},\hat{d}^{(t-1)})P(\vec{\xi}_{i,t}|\hat{d}^{(t-1)}), \quad (1)$$

where c is a normalizing constant.

In equation (1) the term $P(\{\hat{d}_{i,j,t}\}|\vec{\xi}_{i,t},\hat{d}^{(t-1)})$ corresponds to the correction by the current measurements and the term $P(\vec{\xi}_{i,t}|\hat{d}^{(t-1)})$ the prognosis of the estimated position or estimated positional data of node i, with only the past distance measurements being considered.

The following assumptions are now made:

(i) It is assumed that $P(\vec{\xi}_{i,t}|\{\hat{d}_{i,j,t}\},\hat{d}^{(t-1)}) = N(\vec{\xi}_{i,t}|\vec{\mu}_{i,t},A_{i,t})$ is a normal distribution with an average value $\vec{\mu}_{i,t}$ and a covariance matrix $A_{i,t}$.

(ii) The mobility of the nodes as a random process is modeled in accordance with the Monte Carlo method or as a random walk process, with the random walk process being modeled by a normally distributed transition probability with mobility covariance or mobility covariance matrix $D_{i,t}$.

(iii) It is assumed that the distance measurements between nodes i and all its neighbors {j}, i.e. of the nodes of the subset from each other, are statistically independent and normally distributed. Because delayed information is expected for the new position of neighboring nodes, the average value of these normal distributions is equal to $|\vec{\xi}_{i,t} - \vec{\mu}_{j,t-1}|$, with the covariance for these distributions being the sum of the covariance matrix of the preceding position of nodes j, of its mobility variance and mobility covariance matrix and the error of the distance measurement, that are in each case projected on the line connecting nodes i and j. Projection means that the covariance matrix is projected on the line spanned by the connecting vector.

(iv) For the conditional probability $P(\vec{\xi}_{i,t}|\hat{d}^{(t-1)})$, in the following also as a historically-conditional probability (see above), a normal distribution is also assumed. The average value of the historically-conditional probability moreover corresponds to the previous expected value $\vec{\mu}_{i,t-1}$ of $\vec{\xi}_{i,t-1}$. In accordance with the assumptions of (i) and (ii), the corresponding covariance matrix is the sum of $A_{i,t-1}$ and the mobility covariance $D_{i,t}$.

With these assumptions we get the following:

$$N(\vec{\xi}_{i,t}|\vec{\mu}_{i,t}, A_{i,t}) = \quad (2)$$

$$\prod_j N(\hat{d}_{i,j,t}||\vec{\xi}_{i,t} - \vec{\mu}_{j,t-1}|, \vec{e}_{i,j,t}^T(A_{j,t-1} + D_{j,t-1} + \sigma_j^2 I)\vec{e}_{i,j,t}) \times$$

$$N(\vec{\xi}_{i,t}|\vec{\mu}_{i,t-1}A_{i,t-1} + D_{i,t-1}),$$

where
I: Three-dimensional identity matrix
$\vec{e}_{i,j,t}$: Unit vector in the direction of the line connecting node j to node i.

The following applies for the unit vector:

$$\vec{e}_{i,j,t} = (\vec{\mu}_{i,t} - \vec{\mu}_{j,t-1})/|\vec{\mu}_{i,t} - \vec{\mu}_{j,t-1}|. \quad (3)$$

The maximum likelihood criterion leads to $$\nabla_{\vec{\xi}_{i,t}} P(\vec{\xi}_{i,t}|\{\hat{d}_{i,j,t}\})|_{\vec{\mu}_{i,t}} = 0. \quad (4)$$

From equations (1), (2), (3) and (4) we get:

$$\sum_j (\hat{d}_{i,j,t} - |\vec{\mu}_{i,t} - \vec{\mu}_{j,t-1}|)\vec{e}_{i,j,t}(\vec{e}_{i,j,t}^T(A_{j,t-1} + D_{j,t-1} + \sigma_j^2 I)\vec{e}_{i,j,t})^{-1} \approx 0. \quad (5)$$

Equation (5) can be iteratively solved. An iterative calculation with the following iterative formula is particularly advantageous:

$$\vec{\mu}_{i,t}(k+1) = \quad (6)$$

$$\left[(A_{i,t-1} + D_{i,t-1})^{-1} + \sum_j (\vec{e}_{i,j,t}^T(k)(A_{j,t-1} + D_{j,t-1} + \sigma_j^2 I)\vec{e}_{i,j,t}(k))^{-1}\right]^{-1}$$

$$\times \left[(A_{i,t-1} + D_{i,t-1})^{-1}\vec{\mu}_{i,t-1} + \right.$$

$$\sum_j (\vec{e}_{i,j,t}^T(k)(A_{j,t-1} + D_{j,t-1} + \sigma_j^2 I)\vec{e}_{i,j,t}(k))^{-1} \times$$

$$\left. (\vec{\mu}_{i,t-1} + \hat{d}_{i,j,t}\vec{e}_{i,j,t}(k))\right],$$

where $$\vec{e}_{i,j,t}(k) = (\vec{\mu}_{i,t}(k) - \vec{\mu}_{j,t-1})/|\vec{\mu}_{i,t}(k) - \vec{\mu}_{j,t-1}|. \quad (7)$$

The iterative calculation can be begun by using an estimation of the position of the previous time step:

$$\vec{\mu}_{i,t}(0) = \vec{\mu}_{i,t-1}. \quad (8)$$

The iterative calculation is interrupted if the absolute position change with respect to the following iteration step is below a specific threshold value:

$$|\vec{\mu}_{i,t}(k+1) - \vec{\mu}_{i,t}(k)| < \epsilon. \quad (9)$$

The estimations of the relative positions are very imprecise at the start of the iterative calculation. At this stage a convergence with respect to a high accuracy of the position estimation is not necessary, therefore, and in order to limit the processing time, a strict upper limit value is specified for a number of iteration steps. For example 100 iteration steps can be specified as a strict upper limit value. After the position estimations improve, this limit value loses its relevance, because it is never reached. A few iteration steps are then sufficient.

The covariance matrix $A_{i,t}$ can then, as above, be determined as follows:

$$\nabla_{\vec{\xi}_{i,t}}^2 P(\vec{\xi}_{i,t}|\{\hat{d}_{i,j,t}\})|_{\vec{\mu}_{i,t}} = -A_{i,t}^{-1}. \quad (10)$$

The following updating equation can be used for updating $A_{i,t}$:

$$A_{i,t}^{-1} \approx (A_{i,t-1} + D_i)^{-1} + \sum_j \vec{e}_{i,j,t}\vec{e}_{i,j,t}^T(\vec{e}_{i,j,t}^T(A_{j,t-1} + D_j + \sigma_j^2 I)\vec{e}_{i,j,t})^{-1}, \quad (11)$$

Equations (6) and (11), referred to in the following as a first updating equation and second updating equation, enable a common relative position determination or position estimation for node i. The starting value for $\vec{\mu}_{i,t=0}$ is randomly chosen and the starting value for $A_{i,t=0}$ is chosen so as to be large enough to cover the associated distribution of the expected range of the node configuration. The expected range or area in which the nodes are located is usually known. The expansion of this area can be used as a starting value for the covariance matrix A.

Absolute Position Estimation

For many practical applications it is absolutely essential that the coordinates of the nodes in a specific conventional absolute coordinate system be known. The relative coordinates of the nodes in the relative coordinate systems are in this case presumed. If, in addition, the absolute coordinates of some nodes are known, it is possible to determine a transformation of the relative coordinate system into the absolute coordinate system. An embodiment of the method for determining global positional data is described in the following.

The following equation describes a general transformation of relative coordinates $\vec{\mu}_{i,t}$ into absolute coordinates $\vec{x}_{i,t}$:

$$\vec{x}_{i,t} = M_t \vec{\mu}_{i,t} + \vec{b}_t, \quad (13)$$

where $M_t$: Transformation matrix at timepoint t, $\vec{b}_t$: Displacement vector This transformation is global and valid for all nodes. A change of the transformation over time is of course generally possible. If the absolute positions $\vec{\hat{x}}_m$ are externally provided, for example by means of a GPS position determination, and the corresponding relative positions $\vec{\mu}_m$ are known, the transformation ($M_t$, $\vec{b}_t$) can be determined as in the following.

To determine the transformation ($M_t$, $\vec{b}_t$) the quadratic error function is minimized:

$$E_t = \sum_m \left( \vec{\hat{x}}_m - M_t \vec{\mu}_m - \vec{b}_t \right)^2 \quad (14)$$

The best transformation ($M_t$, $\vec{b}_t$) corresponds to the minimum of $E_t$. The necessary conditions are:

$$\nabla_{M_t} E_t = 0, \quad (15)$$

$$\nabla_{\vec{b}_t} E_t = 0. \quad (16)$$

The solution of equations (15) and (16) together with the error function (14) results in the following:

$$M_t = \sum_m \left( \vec{\hat{x}}_m - \langle \vec{\hat{x}}_m \rangle \right) \vec{\mu}_m^T \left( \sum_m (\vec{\mu}_m - \langle \vec{\mu}_m \rangle) \vec{\mu}_m^T \right)^{-1}, \quad (17)$$

$$\vec{b}_t = \langle \vec{\hat{x}}_m \rangle - M_t \langle \vec{\mu}_m \rangle, \quad (18)$$

with the pointed brackets denoting the average value in each case. Equations (17) and (18) stipulate the desired transformation. At least four linear independent absolute positions $\vec{\hat{x}}_m$ are necessary to be able to unambiguously solve the equation system.

If the transformation changes slowly then the transformation ($M_t$, $\vec{b}_t$) will rarely have to be re-calculated. If the transformation is approximately steady, the absolute positions $\vec{\hat{x}}_m$ at different timepoints can be determined. These can also be the absolute position measurements or position determinations of an individual moving node. That means that it is sufficient if the absolute position at different timepoints is determined for only a single moving node. Allowing for the speed of the node, as described in the following, is helpful when stabilizing the transformation.

Improvement by Allowing for the Node Mobility

In a simplest case, the mobility covariance matrix $D_{i,t}$ chosen for slowly-moving nodes can be relatively small and for quickly moving nodes it can be relatively large. This approach has two positive effects. Firstly, the relative coordinate estimations are more exact. Secondly, the transformation from the relative coordinate system to the absolute coordinate system is more stable. This applies at least if not too many nodes are mobile.

The following intrinsic node speed $\vec{v}_{i,t}$ is introduced to allow for the node mobility:

$$\vec{v}_{i,t} = \vec{v}_{i,t-1} + \kappa \left( \frac{\vec{\xi}_{i,t} - \vec{\xi}_{i,t-1}}{\Delta t} - \vec{v}_{i,t-1} \right), \quad (19)$$

where $\kappa$: Smoothness Factor $\Delta t$: Time step

Equation (19) gives the speed of the directed movement with the fluctuations due to the error in the position estimation not being allowed for. The components in the diagonals of the covariance matrix $D_{i,t}$ are equated with the square of the distances, with the distances being covered in the relative direction in time section $\Delta t$:

$$D_{i,t} = |\vec{v}_{i,t} \Delta t|^2 I. \quad (20)$$

The superiority of the method for position determination allowing for node mobility was demonstrated by simulations.

Simulation Results

The method for determining positional data or the method for position determination was applied using the following realistic scenarios. Twenty-five nodes are randomly distributed in a room measuring 20×20×3 m, see FIG. 1. The distance of each node from its neighboring node was now determined and the relative position for each node was updated every 0.2 s. The internode distances and the absolute positions for reference are inexact. In both cases the error is normally distributed. The standard deviation for the error of the internode distance, i.e. the distance between the nodes, was set at 0.3 m and the error of the absolute position relative to the reference was set at 0.5 m.

The aims of the simulation were 1. to assume the input of the absolute position only for the smallest possible number of nodes and
2. to keep the number of these inputs for the respective nodes as small as possible.

Therefore, the following approach was chosen. Only the first node is a mobile node and can determine its absolute position by means of a position measurement or position determination, with the measured absolute position being used to determine the transformation of relative coordinates into absolute coordinates. All other nodes are stationary. The first node moves to each of the other nodes in turn at a constant speed of 1 m/s. The node stops for 10 s at one node, performs the absolute position measurement and moves on to the next node. This movement characteristic of the first node is not a precondition but is very effective. The simulation corresponds to 240 s real time.

The following simulation parameters were used:
σ=0.3 m (see equation (6) and equation (11)),
ε=0.02m (see equation (9)),
κ=0.1 (see equation (19)).

Figure 2:
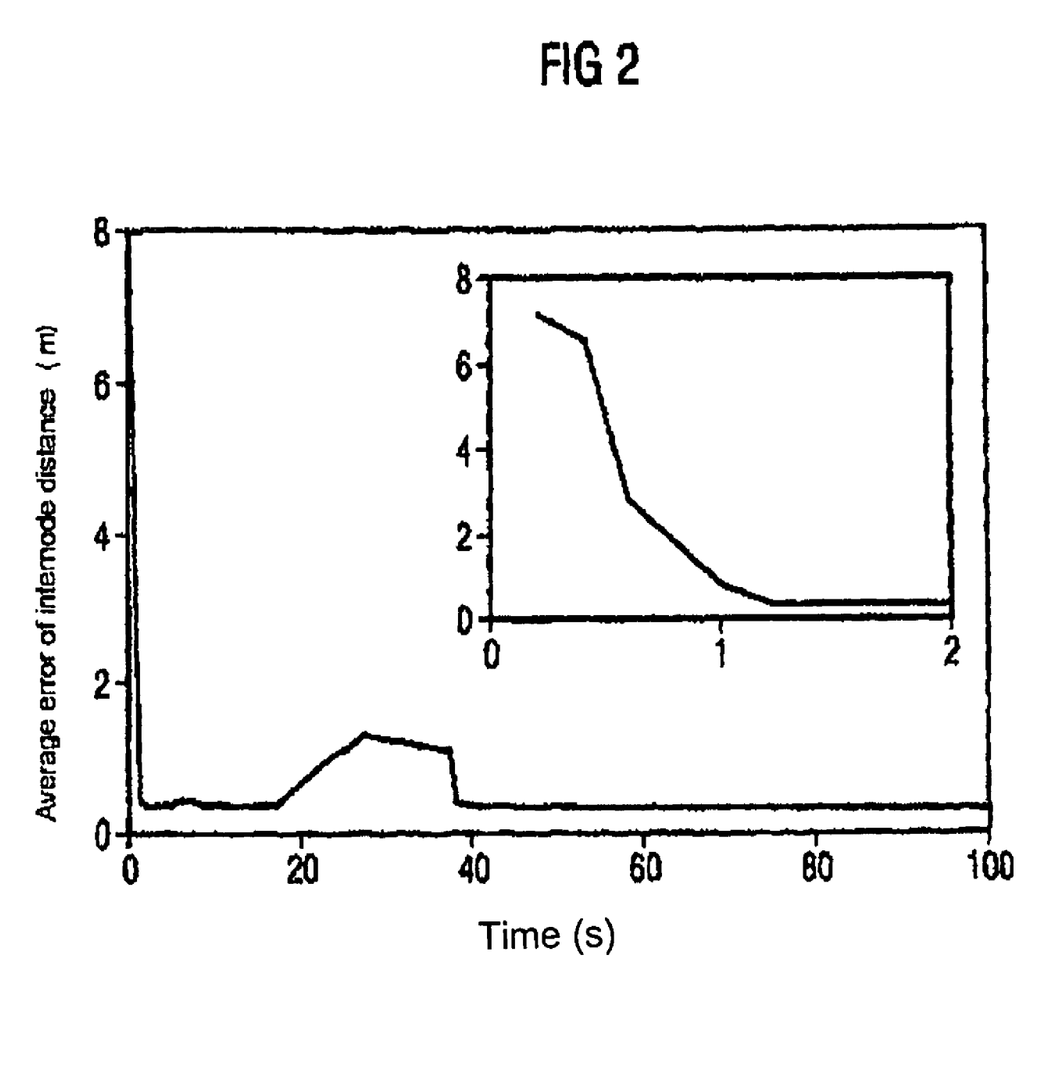

The simulations have shown that the method for determining positional data or the method for determining global positional data can be used under the difficult conditions described above. To assess the determination of relative positional data, the average error of the internode distances, defined as the average difference between the measured internode distances and the corresponding calculated distances of the estimated positions, was checked. The analysis of the dynamics of the average error of the internode distance in FIG. 2 shows that the method for determining relative positional data, i.e. the method for determining positional data, is very effective. The average error achieved within a time of only 1.2 s, or after six jointly exchanged position estimations was less than 0.4 m.

Figure 1:
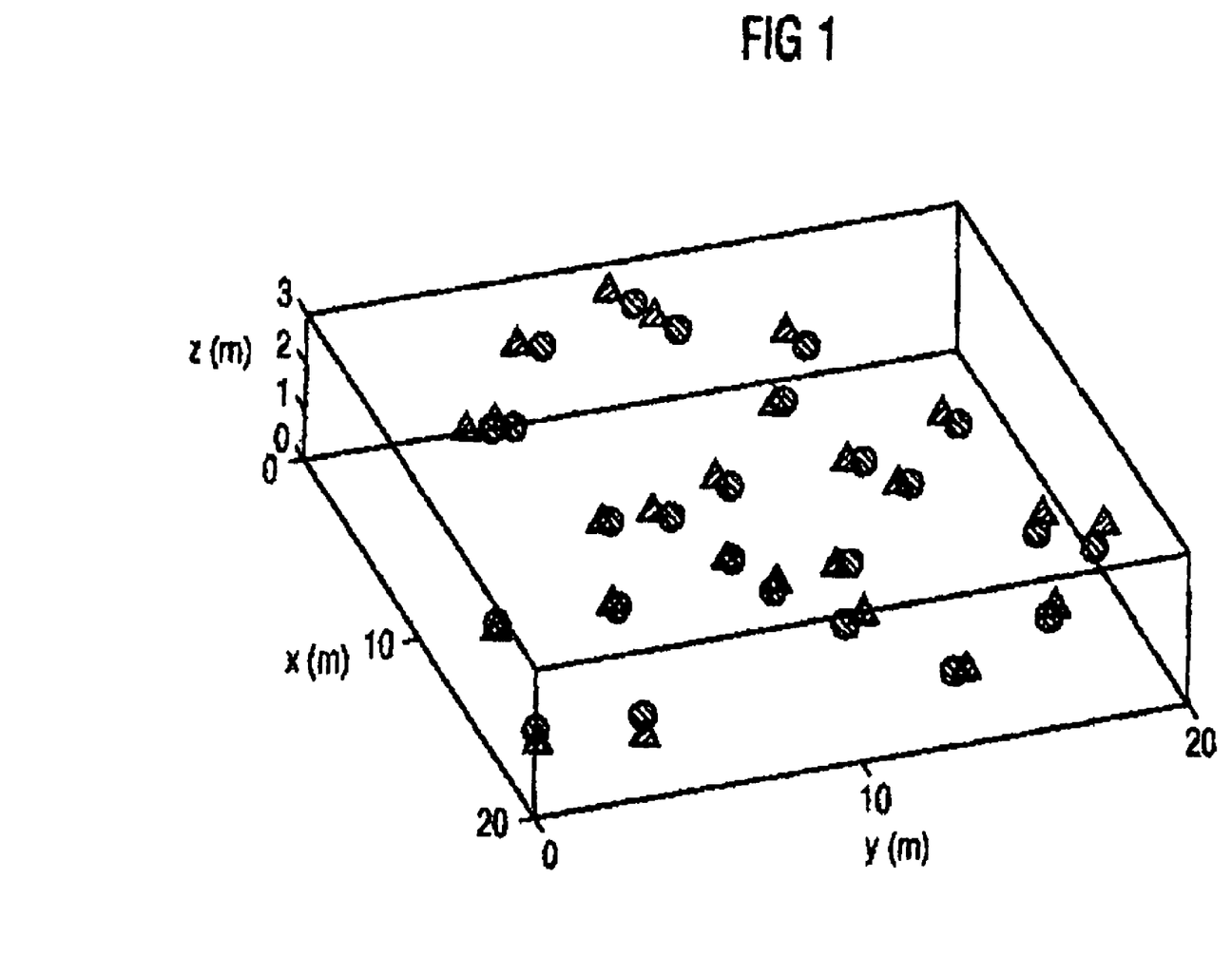
FIG. 1-7 Results of simulations of the method for determining positional data in the internal coordinate system and the method for determining global positioning data, and FIG. 8 An example of a network with nodes.
Figure 3:
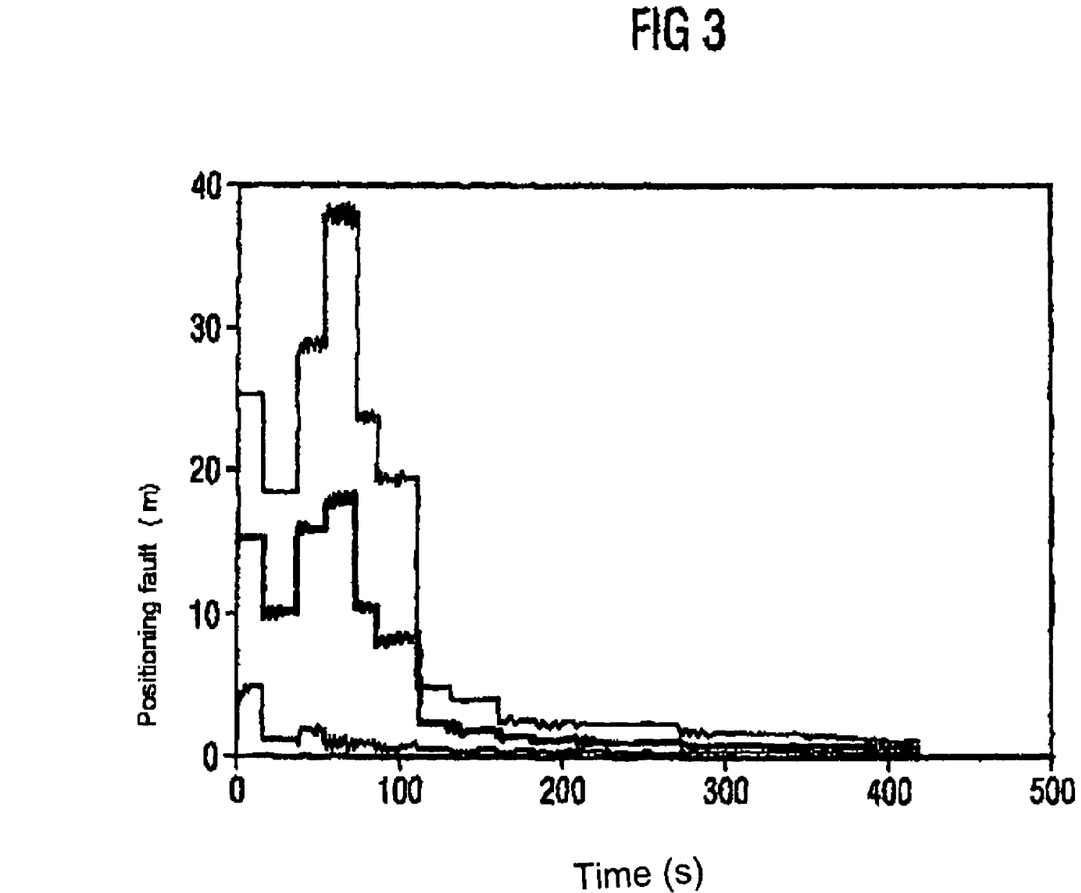
Figure 4:
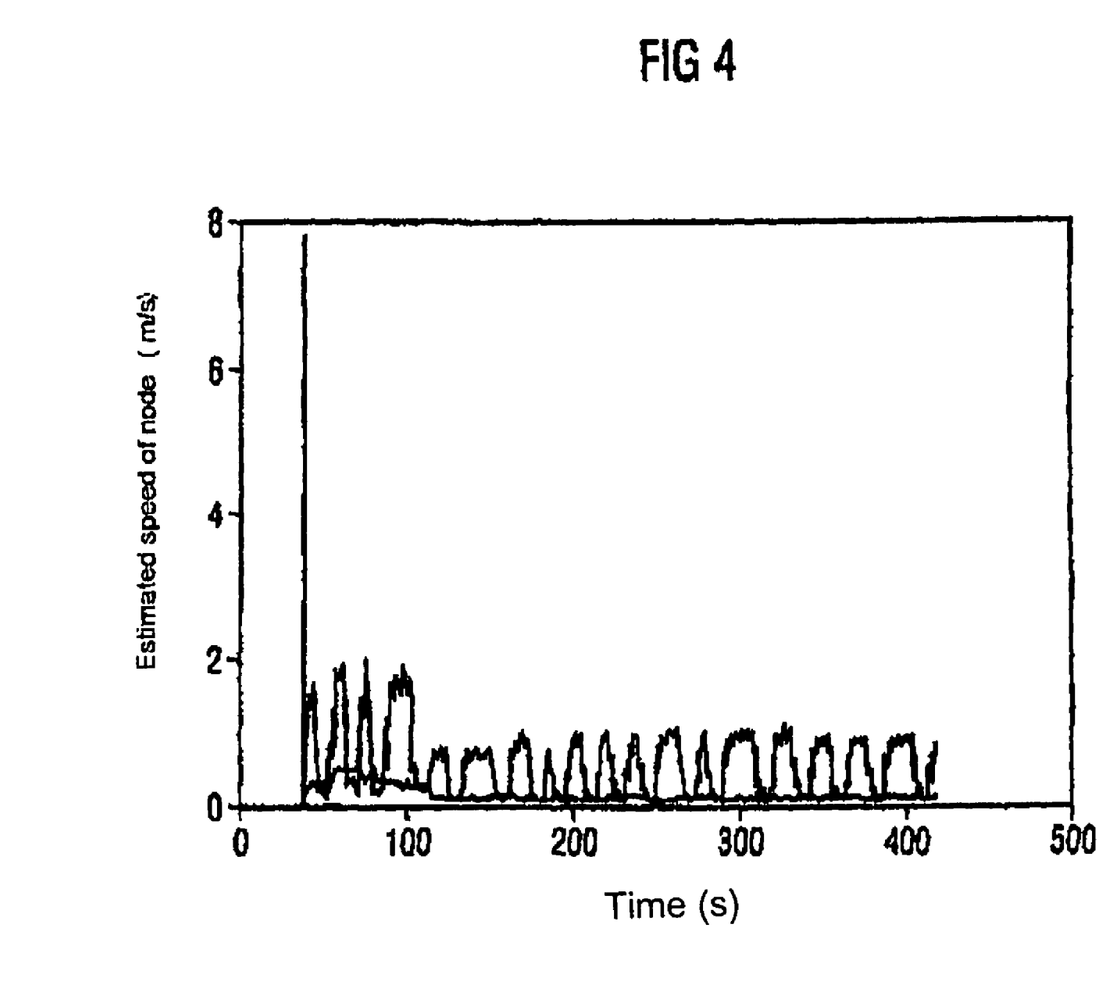

After 420 s real time with only 20 inputs of absolute or global positions for reference the average error of the positioning was 0.52 m, as can be seen in FIGS. 1 and 3. It is worth noting that the maximum error during positioning was close to the average error, see FIG. 3. FIG. 4 shows that the mobility of the first node is well recognized. The estimation of the speed after 100 s becomes relatively accurate if a satisfactorily good node configuration or a good arrangement of nodes was determined by the method. FIG. 5 shows that the transformation of the relative coordination system into the absolute coordinate system becomes stable when the number of absolute positions for reference when determining the transformation has reached eight.

Figure 6:
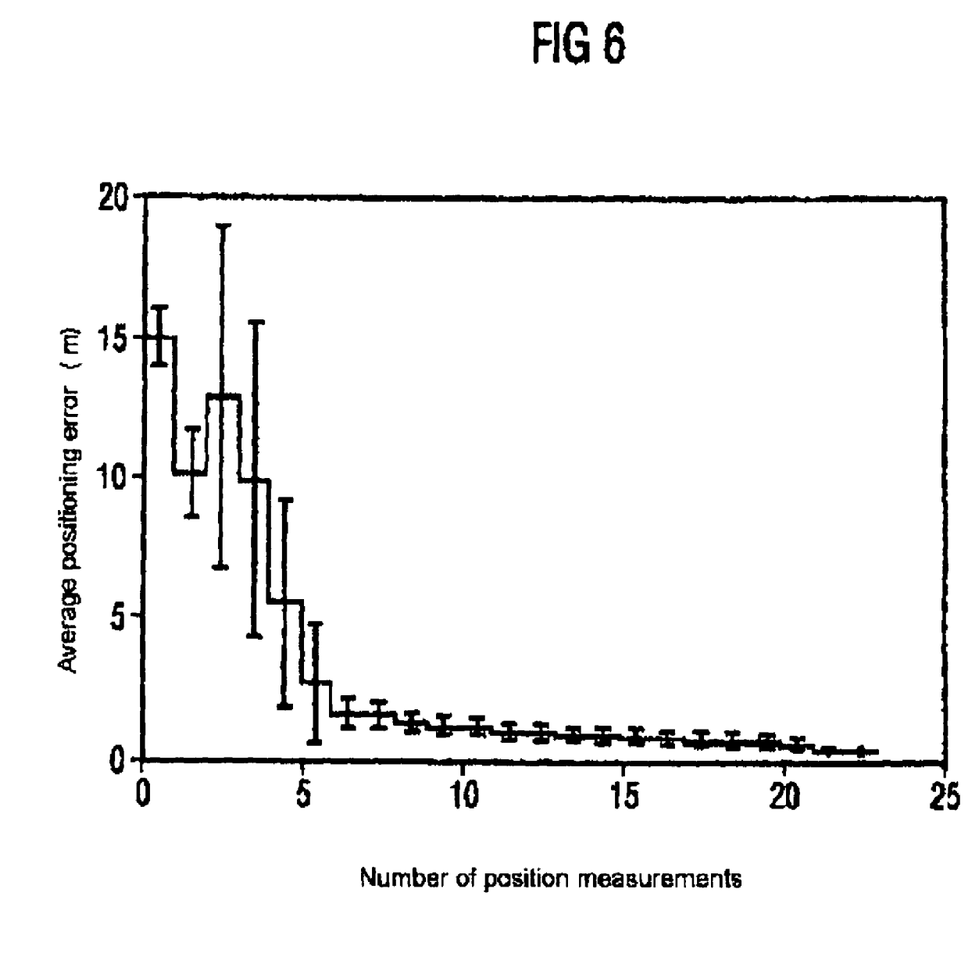

The method for determining positional data or the method for determining absolute positional data was also tested using various spatial arrangements of nodes. FIG. 6 shows the average error of the absolute position determination relative to the number of absolute positions for reference. The statistics cover various node arrangements or node configurations. In this case it is to be noted that the reduction in the error is greatest during the fourth position measurement. This corresponds precisely to the theoretical requirement for four absolute or global positions for reference, in order to unambiguously determine the transformation. At ten position measurements the average error during positioning drops to 1 m. A further 10 measurements reduce the error to approximately 0.5 m. This value corresponds to the same order of magnitude as the chosen error of the internode distance and the error of the absolute position for reference. It should be pointed out that the number of position measurements or the number of measurements means that corresponding pairs of positions in relative coordinates and absolute coordinates are determined.

The stability of the method was also ascertained for a case where after the setup phase no absolute positions measurements were determined, i.e. no further positional data was determined after the setup phase. In the first 200 s only 10 absolute position measurements were taken. The dynamics of the free system was then simulated for fifteen minutes. The results, shown in FIG. 7, indicate that the method for determining positional data continues to provide good position estimates without a significant drop in accuracy.

Further simulations were performed in order to investigate the performance of the method under various simulation scenarios. These included additional mobile nodes, nodes that moved occasionally and absolute position measurements of various nodes. In doing so, the effect of the error when measuring the internode distances and the error of the absolute position measurements were investigated. It was possible to show during the simulations that the method can be successfully used for various simulation scenarios.

To sum up, the method for determining positional data, or the method for determining global positional data, could be successfully used for the realistic and difficult scenario with a mobile node that determines its absolute position occasionally. Known methods could not be used successfully for this difficult scenario. A great advantage of the inventive method is that no permanently available anchor nodes or beacons are required.

BRIEF DESCRIPTION OF THE DRAWINGS

The results of simulations, shown in FIG. 1-7 are again summarized in the following.

DETAILED DESCRIPTION OF INVENTION

FIG. 1 shows the arrangement of the exact node positions, represented by triangles, and the estimated positions of nodes, represented by dots, after a simulation time of 420 s.

FIG. 2 refers to the relative coordinate system and shows the dynamics of the average error of the internode distance.

FIG. 3 refers to the external or global coordinate system and shows the dynamics of the average positioning error, represented by a thick line, and the maximum and minimum positioning errors, represented in each case by a thin line.

FIG. 4 shows the estimated node speeds. The above intermittent curve corresponds to the first mobile node; the other curves underneath refer to the other nodes.

Figure 5A:
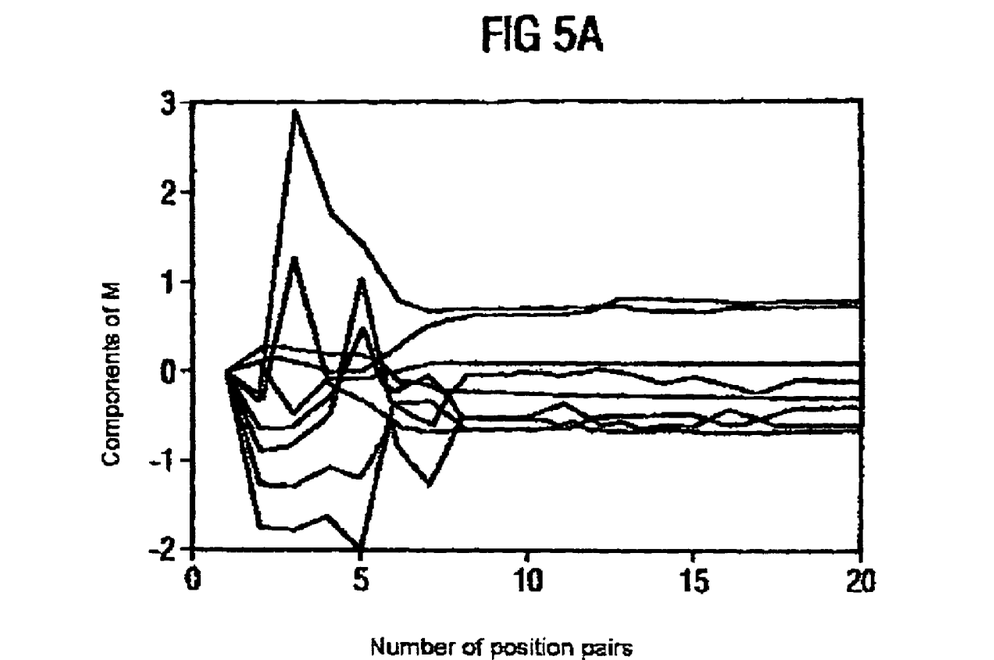
Figure 5B:
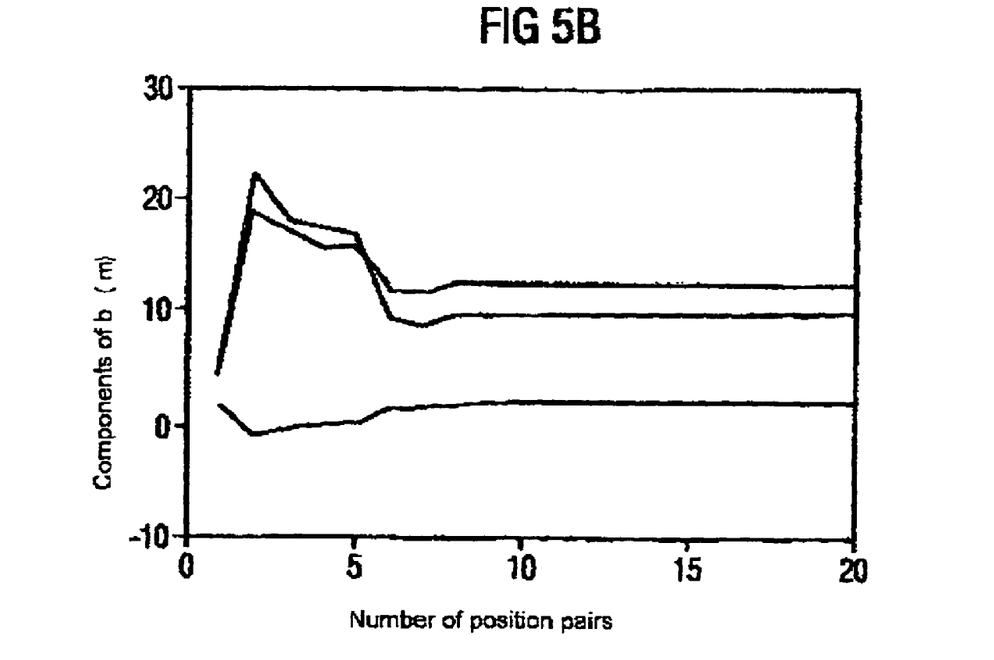

FIG. 5 shows the estimated transformation of the relative coordinate system to the absolute coordinate system, with an increasingly greater amount of absolute positions being used for reference, i.e. an increasing number of absolute reference positions or pairs of coordinates in relative and absolute coordinates. FIG. 5a shows the components of the transformation matrix $M_t$, FIG. 5b shows the components of the displacement vector $\vec{b}_t$.

FIG. 6 shows the error of the absolute positioning relative to the number of absolute positions for reference or the number of position pairs. The number of position pairs corresponds to the number of measured positions that are known both in the relative coordinates and in the absolute coordinates. The bars in FIG. 6 show the standard deviation. The statistics cover ten different node arrangements.

Figure 7:
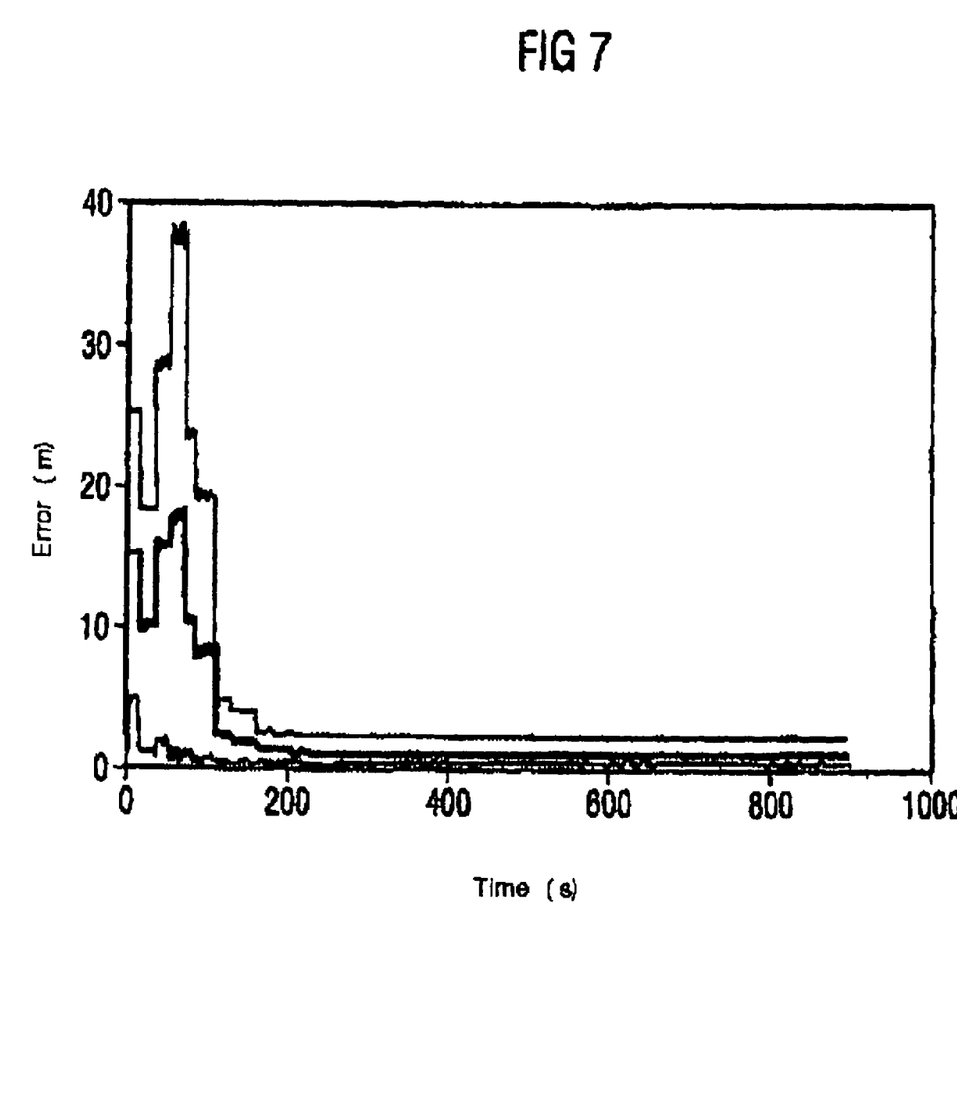

FIG. 7 shows the free dynamics of the average positional error (thick line) and the maximum and minimum positioning errors (top and bottom thin lines). In this case, ten measurements for determining the absolute position were taken in the first 200 s.

The invention claimed is:

1. A method for determining positional data of a mobile node of a network that includes a plurality of mobile nodes, comprising:
providing a first and second coordinate system wherein the first coordinate system is a relative coordinate system to the second coordinate system;
relating the positional data of the mobile node to the first coordinate system;
determining a subset of nodes form a plurality of nodes located within the first or second coordinate system, wherein at least a portion of the subset of nodes are mobile;

selecting an outlier mobile node that is not part of the subset of nodes; and identifying a position of the outlier mobile node via the steps:

providing positional data for the subset of nodes, wherein the positional data describes the respective position of the subset of nodes in the first coordinate system, determining distances of the outlier node to the subset of nodes, and determining the positional data of the outlier node based upon the positional data of the subset of nodes, and the determined distances of the outlier nodes and the positional data of the outlier node.

2. The method as claimed in claim 1, wherein the positional data is an initial position data at a first performance of the identification of the position of the outlier node.

3. The method as claimed in claim 1, wherein the positional data is a result of previous performance of determining the positional data of the outlier node and the positional data of the outlier node is determined until an interruption condition is fulfilled.

4. The method as claimed in claim 1, wherein the network is an Ad-Hoc network.

5. The method as claimed in claim 1, wherein the network consists exclusively of mobile nodes, the position of the mobile nodes not being known prior to a request to determine the position of the mobile nodes.

6. The method as claimed in claim 1, wherein the positional data of each node of the subset has information selected from the group consisting of:
the position of the respective node,
the estimated position of the respective node,
a rate of uncertainty of the position of the node,
a rate of uncertainty of the estimated position of the node,
a rate of mobility of the respective node, and
combinations thereof.

7. The method as claimed in claim 6, wherein the rate of the mobility of the respective node is dependent upon a variable selected from the group consisting of:
a diffusion constant,
an estimation of the actual speed vector, and
an estimated trajectory.

8. The method as claimed in claim 6, wherein the rate of mobility of the mobile node is determined from previous observations.

9. The method as claimed in claim 1, wherein the distance of outlier node from nodes of the subset is determined by means of a hop distance.

10. The method as claimed in claim 1, wherein the positional data of the at least one node is modeled as a random variable $\vec{\xi}_{i,t}$ and is determined by means of the expected value $\vec{\mu}_{i,t}$ of this random variable $\vec{\xi}_{i,t}$.

11. The method as claimed in claim 10, wherein the position of the outlier node is determined by means of an iterative calculation in accordance with the following iterative calculation rule:

$$\vec{\mu}_{i,t}(k+1) =$$

$$\left[ (A_{i,t-1} + D_{i,t-1})^{-1} + \sum_j (\vec{e}^T_{i,j,t}(k)(A_{j,t-1} + D_{j,t-1} + \sigma_j^2 I)\vec{e}_{i,j,t}(k))^{-1} \right]^{-1} \times$$

-continued $$\left[ (A_{i,t-1} + D_{i,t-1})^{-1} \vec{\mu}_{i,t-1} + \sum_j (\vec{e}^T_{i,j,t}(k)(A_{j,t-1} + D_{j,t-1} + \sigma_j^2 I)\vec{e}_{i,j,t}(k))^{-1} \times \right.$$

$$\left. (\vec{\mu}_{j,t-1} + \hat{d}_{i,j,t}\vec{e}_{i,j,t}(k)) \right],$$

where $\vec{e}_{i,j,t}(k) = (\vec{\mu}_{i,t}(k) - \vec{\mu}_{j,t-1})/|\vec{\mu}_{i,t}(k) - \vec{\mu}_{j,t-1}|$, $A_{x,\tau}$: Covariance matrix of the node x at timepoint $\tau$,
$D_{x,\tau}$: Diffusion constant of the node x at timepoint $\tau$ and
$\mu_{x,\tau}$: Position of the node x at timepoint $\tau$,
$d_{x,y,\tau}$: Measured distance between node x and node y at timepoint $\tau$.

12. The method as claimed in claim 1, wherein a interruption criterion is fulfilled if the amount of the changes of the positional data of the at least one node since the last identifying of the position of the outlier mobile node is less than a predetermined threshold value or the iterative calculation is interrupted if the absolute position change between two successive iteration steps is less than a predetermined value $\epsilon$ so that the following applies:

$|\vec{\mu}_{i,t}(k+1) - \vec{\mu}_{i,t}(k)| < \epsilon$.

13. A method for determining positional data of a mobile node of an ad-hoc network that includes a plurality of mobile nodes, comprising:

providing a first and second coordinate system wherein the first coordinate system is a relative coordinate system to the second coordinate system;

relating the positional data of the mobile node to the first coordinate system;

determining a subset of nodes form a plurality of nodes located within the first or second coordinate system, wherein at least a portion of the subset of nodes are mobile;

selecting an outlier mobile node that is not part of the subset of nodes;

identifying a position of the outlier mobile node via the steps:

providing positional data for the subset of nodes, wherein the positional data describes the respective position of the subset of nodes in the first coordinate system, determining distances of the outlier node to the subset of nodes, and determining the positional data of the outlier node based upon the positional data of the subset of nodes, and the determined distances of the outlier nodes and the positional data of the outlier node, using a initial position as positional data of the outlier node at a first performance of the identification of the position of the outlier node;

using previous results as positional data of the outlier node at a performance followed by the first; and identifying the position of the outlier mobile node until an interruption condition is fulfilled.

14. A method for determining global positional data for a mobile node or for all nodes of a network that include a number of nodes, with the global positional data referring to a global coordinate system, comprising:

providing a first and second coordinate system wherein the first coordinate system is a relative coordinate system to the second coordinate system and the second coordinate system is the global coordinate system;

relating the positional data of the mobile node to the first coordinate system;

determining a subset of nodes form a plurality of nodes located within the first or second coordinate system, wherein at least a portion of the subset of nodes are mobile;

selecting an outlier mobile node that is not part of the subset of nodes;

identifying a position of the outlier mobile node via the steps:

providing positional data for the subset of nodes, wherein the positional data describes the respective position of the subset of nodes in the first coordinate system, determining distances of the outlier node to the subset of nodes, and determining the positional data of the outlier node based upon the positional data of the subset of nodes, and the determined distances of the outlier nodes and the positional data of the outlier node;

determining of the global positional data of the outlier node depending on the relative positional data by means of a transformation.

15. The method as claimed in claim 14, wherein the transformation is determined by means of a linear regression approach, depending on a number of position pairs, with a position pair in each case including positional data of a node according to the first coordinate system and global positional data of the same node according to the global coordinate system.

16. The method as claimed in claim 14 wherein the position pairs are permanently available via anchor nodes.

17. The method as claimed in claim 14, wherein the position pairs are determined by position measurements for the respective nodes, with the respective global positional data of the respective nodes being determined by means of a global position determining device.

18. The method as claimed in claim 14, wherein the position pairs are determined by position measurements, with a mobile node determining that global positional data for the position pairs at different timepoints by means of a digital map and thus providing various position pairs.

19. The method as claimed in claim 14, wherein the global positional data $\vec{x}_{i,t}$ of a node of the network is determined by the following calculation:

$$\vec{x}_{i,t} = M_t \vec{\mu}_{i,t} + \vec{b}_t$$

where $M_t$: Transformation matrix at timepoint t, $\vec{b}_t$: Displacement vector at timepoint t.

20. The method as claimed in claim 19, wherein the transformation matrix $M_t$ is determined by the following calculation:

$$M_t = \sum_m \left( \hat{\vec{x}}_m - <\hat{\vec{x}}_m> \right) \vec{\mu}_m^T \left( \sum_m (\vec{\mu}_m - <\vec{\mu}_m>) \vec{\mu}_m^T \right)^{-1}.$$

where $\vec{x}_m$: Global position vector $<\vec{x}_m>$: Average value of all the global position vectors of the position pairs $<\vec{\mu}_m>$: Average value of all the relative position vectors of the position pairs.

* * * * *